United States Patent [19]

Beimgraben

[11] Patent Number: 4,495,073
[45] Date of Patent: Jan. 22, 1985

[54] RETRIEVABLE SCREEN DEVICE FOR DRILL PIPE AND THE LIKE

[75] Inventor: Herbert W. Beimgraben, Houston, Tex.

[73] Assignee: Baker Oil Tools, Inc., Orange, Calif.

[21] Appl. No.: 544,209

[22] Filed: Oct. 21, 1983

[51] Int. Cl.³ .............................................. B01D 35/02
[52] U.S. Cl. .................................. 210/448; 210/452; 166/227; 175/314
[58] Field of Search ............... 210/435, 237, 446, 441, 210/238, 323.2, 339, 447, 497.3, 449, 452, 457, 470, 448, 451; 166/227, 157; 175/314

[56] References Cited

U.S. PATENT DOCUMENTS

| | | | |
|---|---|---|---|
| 2,152,980 | 4/1939 | Svadlenak | 175/314 |
| 2,942,670 | 6/1960 | Burns et al. | 175/314 |
| 3,429,448 | 2/1969 | Rosell | 210/497.3 |
| 3,450,207 | 6/1969 | Hirsch | 210/497.3 |
| 3,749,250 | 7/1973 | Oldford | 210/452 |
| 3,941,697 | 3/1976 | Johnson | 210/167 |
| 3,970,563 | 7/1976 | Codo | 210/237 |
| 4,169,793 | 10/1979 | Lockshaw | 210/238 |

Primary Examiner—John Adee
Attorney, Agent, or Firm—Norvell & Associates

[57] ABSTRACT

A mud screen for installation between any two selected ends of interconnected pipes, such as a drill pipe string, comprises a supporting collar anchored in the selected threaded connection of the drill pipe string and a screen support mounted on such collar and secured thereto by one or more releasing devices. An apertured inverted conical screen is supported by the screen support in transverse relationship to the pipe bore. A bridging element is secured across the screen support and defines a mounting for an upstanding post which functions as a manual handle and also defines a fishing neck at its upper end for downhole retrieval.

7 Claims, 4 Drawing Figures

RETRIEVABLE SCREEN DEVICE FOR DRILL PIPE AND THE LIKE

BACKGROUND OF THE INVENTION

1. Field of the Invention

The invention relates to a filtering device or screen which can be incorporated at any desired location in a tubular drill string for the purpose of filtering debris out of the drilling fluid and which can be conveniently removed either manually when the screen is adjacent the rig floor, or removed by an overshot type fishing tool when the screen is positioned downhole.

2. History of the Prior Art

In the drilling of subterranean wells it is very desirable to filter the drilling fluid so that it does not contain any solids that may plug or damage any of the downhole tools. It therefore has been the common practice to install a filter at the mud pump, but this filter has often proved inadequate and also provides no protection for debris that may be accidentally dropped into the tubular drill string in the process of its assemblage on the rig floor. To alleviate this condition, mud screens have been inserted into the tubular drill string but have had the disadvantage of being cumbersome to install and even more difficult to remove or to clean, if necessary. In most cases, the removal can only be accomplished by tripping the pipe out of the hole which, of course, becomes impossible in the event that the pipe is stuck. If left in place, the downhole screen will provide a blockage to any tools such as survey instruments, string shots, etc. that may be desired to be run any time during the drilling operation. Of course, the screen may eventually become plugged and severely limit the flow of fluid unless it is removed and cleaned occasionally. Downhole type screens heretofore provided have not been capable of removal without running an extreme risk that the debris that has been captured by the screen will escape from the screen during the removal process and plug the downhole devices that were meant to be protected in the first place.

SUMMARY OF THE INVENTION

The invention provides an improved apparatus for the filtering of drilling fluids that may be inserted into the drilling string at any desired location, i.e., at the kelly or downhole. The screen of this invention comprises a mounting collar which is insertable between the two threadably connected ends of any two lengths of the drill string. The screen further comprises a support element having a downwardly facing shoulder cooperating with an upwardly facing shoulder formed on the collar to prevent the downward movement of the screen past the collar. Attached to the support element of the screen is an inverted conical section which is provided with a plurality of apertures of the size sufficient to permit the ready flow of drilling fluid therethrough, but to trap any particles of a size greater than such aperture. One or more releasing devices effects the connection of the screen support element to the mounting collar.

A supporting bridge is provided across the screen support element and in its center there is rigidly secured an upstanding post or handle which terminates in a fishing neck. Such handle permits the convenient manual manipulation of the screen, permitting it to be readily inserted during the assembly of the drill string at the drill rig floor, or manually removed therefrom. When the screen is positioned downhole, the fishing neck on the top end of the handle permits engagement by an overshot type fishing tool, whereupon an upward force can be applied to the handle to effect the upward removal of the particle filled screen from its downhole position.

Obviously, the major portions of the apparatus can be repeatedly used since it is only necessary to reengage the releasing devices and mount the retrieved screen in a new collar.

In accordance with a modification of the invention, the screen support element is provided with a vertical aperture or slot adjacent its periphery to permit the ready passage therethrough of a wire or electric line of tools located below the downhole position of the screen.

Further advantages of the invention will be readily apparent to those skilled in the art from the following detailed description, taken in conjunction with the annexed sheets of drawings, on which is shown the preferred embodiments of the invention.

DESCRIPTION OF THE PREFERRED EMBODIMENTS

Figure 1:
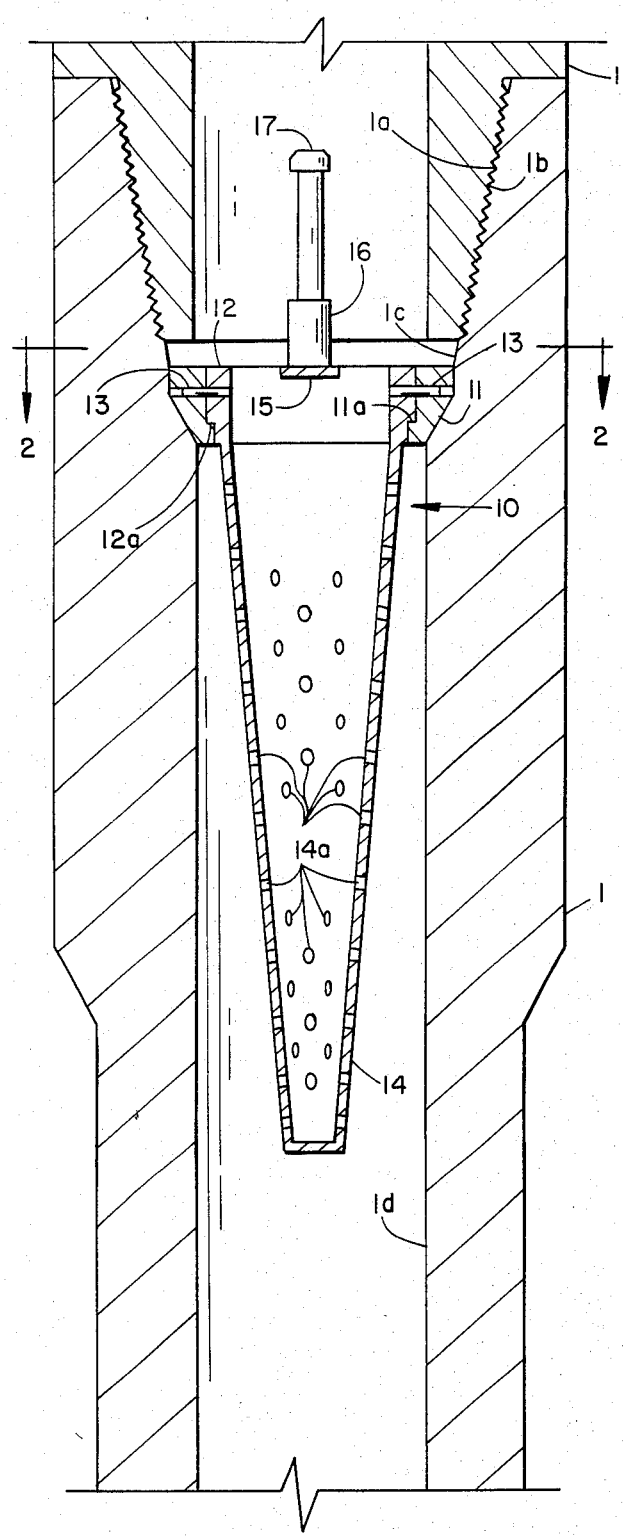
FIG. 1 is a vertical sectional view illustrating the installation of a mud screen embodying this invention in a well conduit, such as a drilling pipe.
Figure 2:
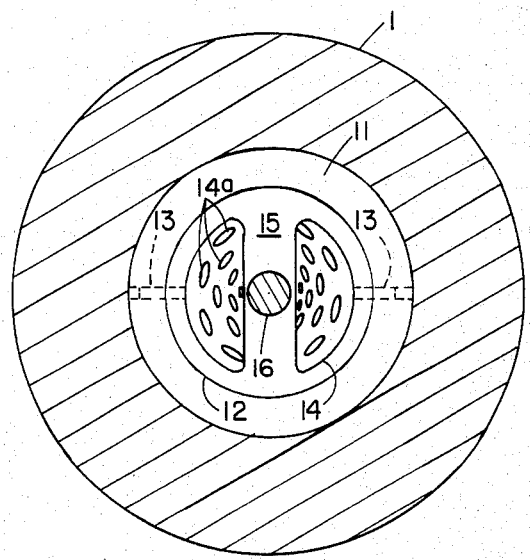
FIG. 2 is a sectional view taken on the plane 2—2 of FIG. 1.

While a screen embodying this invention may be employed in any well conduit, it finds particular application in drill pipe strings utilized for conducting drilling mud to downhole well drilling tools. Such drilling pipe comprises a plurality of identical sections 1 having an upper internally threaded end 1a and a lower externally threaded end 1b. When such ends are threadably interengaged, as shown in FIG. 1, an annular recess 1c is defined between the threadably interconnected ends and this recess is employed for the securement of the mounting collar 11 of a retrievable screen 10 embodying this invention. Mounting collar 11 defines an upwardly facing, internally projecting shoulder 11a with which a downwardly facing annular surface 12a of a screen supporting ring 12 is abuttingly engageable. At least one, and preferably several radially disposed shear pins 13 are provided to detachably interconnect the support ring 12 with the collar 11.

A perforated screen 14 of generally inverted frustoconical configuration is rigidly secured to the bottom portions of ring 12 and is thus disposed in transverse relationship to the bore 1d defined by the interconnected pipes 1. The perforations 14a provided in the conical screen element 14 are sized so as to permit ready passage of drilling mud therethrough, but to effect the trapping of particles having sufficient size to represent a hazard to any of the drilling tools and/or instruments disposed below the screen 10.

Figure 3:
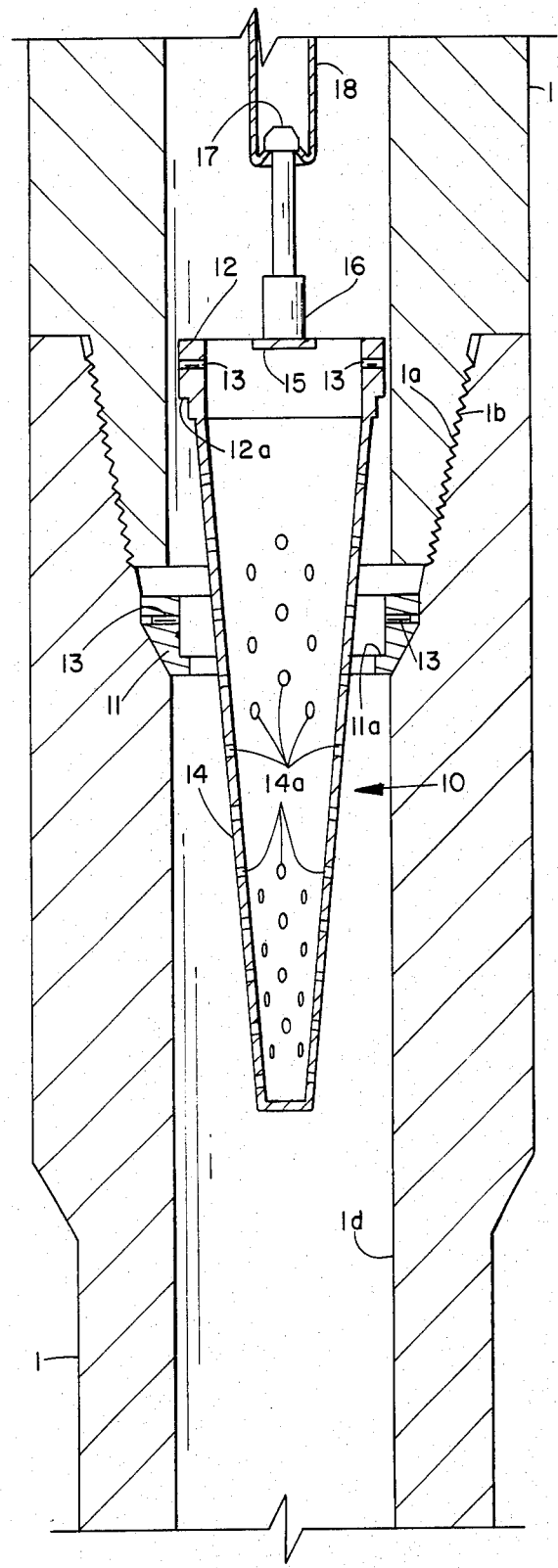
FIG. 3 is a view similar to FIG. 1 but illustrating the downhole removal of the mud screen by the employment of an overshot type fishing tool.

A bridging bar 15 is rigidly secured in transverse relationship to the screen support ring 12. An upstanding post or handle 16 is rigidly secured to the central portions of the bridging bar 15 and thus defines a convenient handle by which the screen assembly may be manually handled on the rig floor, either during pipe assembly or disassembly operations. The top end of handle 16 is provided with a fishing neck 17 of the type to be engaged by a conventional overshot fishing tool 18 schematically shown in FIG. 3.

It will be readily apparent to those skilled in the art that the mud screen 10 embodying this invention may be conveniently assembled at the drill floor as the pipe sections 1 are assembled. If positioned immediately below the kelly, the screen element 10 may be conveniently manually removed each time that the kelly is moved upwardly to permit the insertion of another length of drill pipe. On the other hand, the screen 10 may be left in its assembled relationship with the drill pipe lengths 1 and moved downhole with the drill pipe string as the drilling progresses. At the completion of the drilling operation, or when it is desired to remove the apertured screen 14 for cleaning, the fishing neck 17 may be engaged by the overshot 18 and an upward force exerted on the handle post 16 to effect the shearing of shear pins 13 and the upward removal of the apertured screen element 14 of the device without incurring any risks that particles trapped within the screen will be dislodged and permitted to fall into the well. The removed portions of the mud screen 10 comprising the supporting ring 12, the apertured screen 14, and the combination handle and fishing neck post 16 may then be reused merely by effecting its assemblage with another collar element 11 by utilization of appropriate shear screws. Obviously, the collar element 11 left in a downhole position in the interconnected drill pipes 1 does not present any obstacle to the passage of drilling fluid and/or tools or testing devices through its bore.

Figure 4:
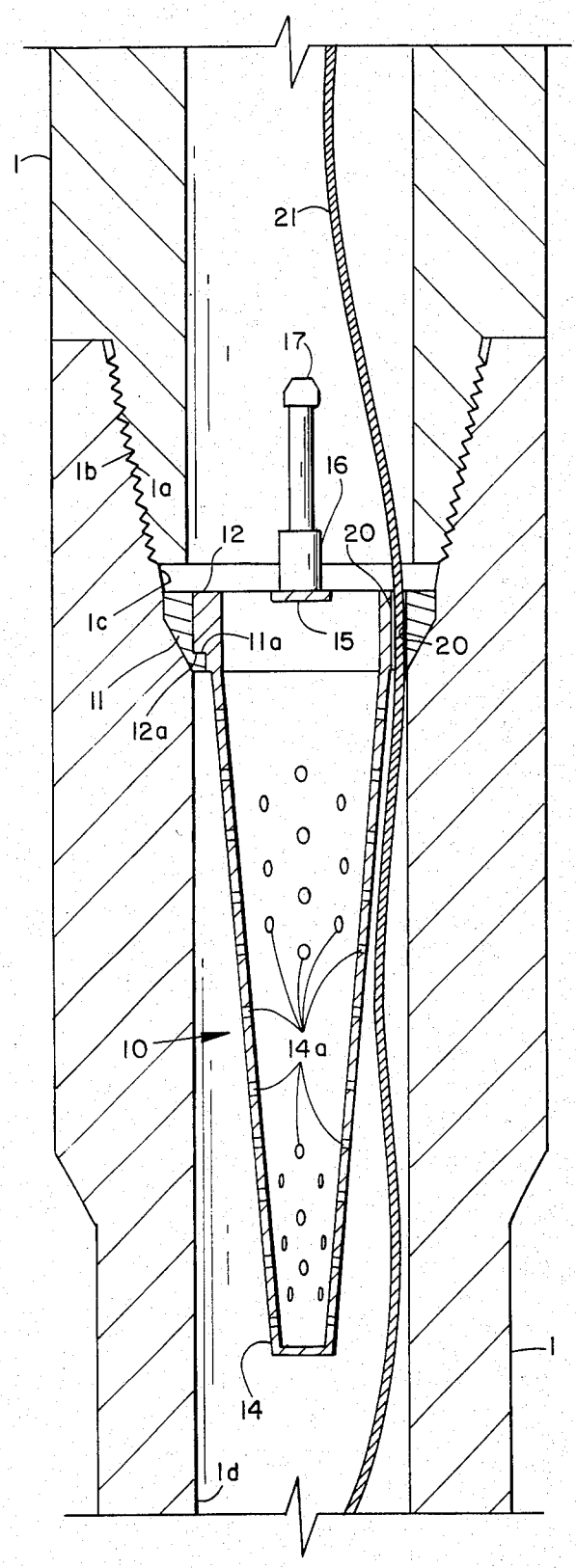
FIG. 4 is a view similar to FIG. 1 showing a further embodiment of this invention wherein a vertical passage is provided in the mud screen for a wire line.

It often happens that it is desired to run a wire line to a tool positioned downhole relative to the mud screen 10. In such cases, the embodiment of this invention illustrated in FIG. 4 may be employed. A vertically extending slot 20 sized to accommodate passage of a wire line 21 therethrough is provided in the peripheral portion of the mounting collar 11 and supporting ring 12. The operation, installation, and removal of this embodiment is identical to that previously described.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A retrievable screen for a well conduit defined by selectively connectable lengths of tubular members, comprising: a collar element constructed and arranged for mounting between any two of the selectively connectable ends of the tubular members; a screen element inserted in said collar and supported thereby in transverse relationship to the well conduit bore, said screen element having restricted apertures therethrough permitting flow of fluids but trapping all particles sized greater than said apertures; releasing means connecting said screen element to said collar, whereby the application of an applied axial force to said screen element effects the activation of said releasing means and the removal of said filter element; handle means rigidly secured to said screen element, said handle means terminating in a fishing neck, thereby permitting manual insertion of said screen element in the well conduit and downhole retrieval of said screen element by an overshot fishing tool.

2. A retrievable screen pursuant to claim 1 wherein said screen element is of inverted conical configuration, thereby preventing spillage of trapped particles during removal of said screen element from the well conduit.

3. A retrievable screen pursuant to claim 1 wherein said collar defines an inwardly projecting, upwardly facing, annular shoulder and said screen element has a downwardly facing annular shoulder abuttable with said collar shoulder.

4. A retrievable screen pursuant to claim 3 wherein said releasing means comprises at least one radially disposed shear pin connecting radially adjacent portions of said collar and said screen element.

5. A retrievable screen pursuant to claim 3 further comprising a vertical aperture disposed in the rim portion of said screen element to permit passage therethrough of a control wire.

6. A retrievable screen pursuant to claim 3 further comprising a rigid bar traversing the top opening of said conical screen element and rigidly secured thereto; said handle being rigidly secured to the center portions of said bar.

7. A retrievable screen pursuant to claim 1 further comprising a rigid bar traversing the top opening of said screen element and an upwardly projecting axially concentric handle rigidly secured to the center portions of said bar.

* * * * *